May 27, 1930. G. W. HARPER 1,760,356
AXLE
Filed Aug. 1, 1924  3 Sheets-Sheet 1

INVENTOR.
George W. Harper
BY
Fay, Oberlin & Fay
ATTORNEYS

May 27, 1930.  G. W. HARPER  1,760,356
AXLE
Filed Aug. 1, 1924   3 Sheets-Sheet 2

INVENTOR.
George W. Harper
BY
Fay, Oberlin & Fay
ATTORNEYS

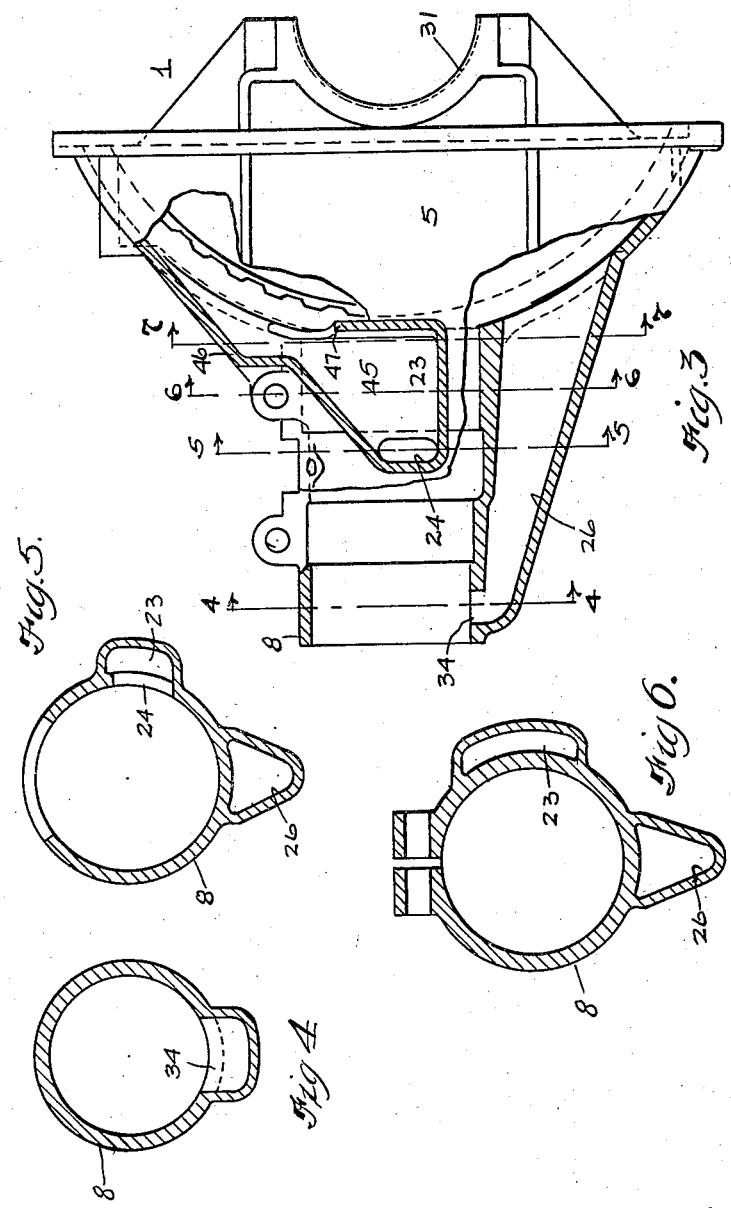

Patented May 27, 1930

1,760,356

UNITED STATES PATENT OFFICE

GEORGE W. HARPER, OF CLEVELAND, OHIO, ASSIGNOR TO THE COLUMBIA AXLE COMPANY, OF CLEVELAND, OHIO, A CORPORATION OF OHIO

AXLE

REISSUED

Application filed August 1, 1924. Serial No. 729,505.

The present invention, relating, as indicated, to axles, is particularly directed to a self-lubricating axle provided with means for automatically lubricating bearings in the driving shaft from the differential housing through the action of the differential driven gear, together with means for returning any excess of lubricant delivered to the outermost of these bearings from a point beyond the same to such housing, and with means for effectually preventing leakage of any of the lubricant from the forward end of the housing for the driving shaft. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
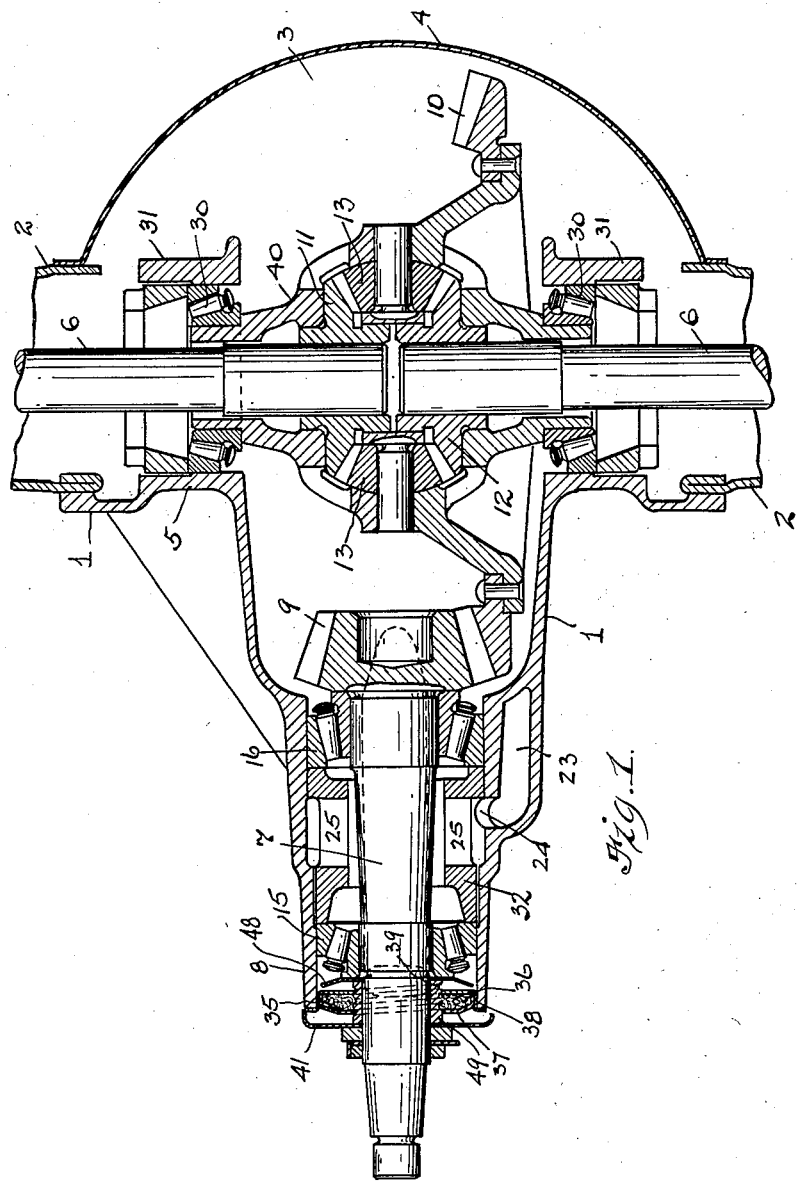
Figure 2:
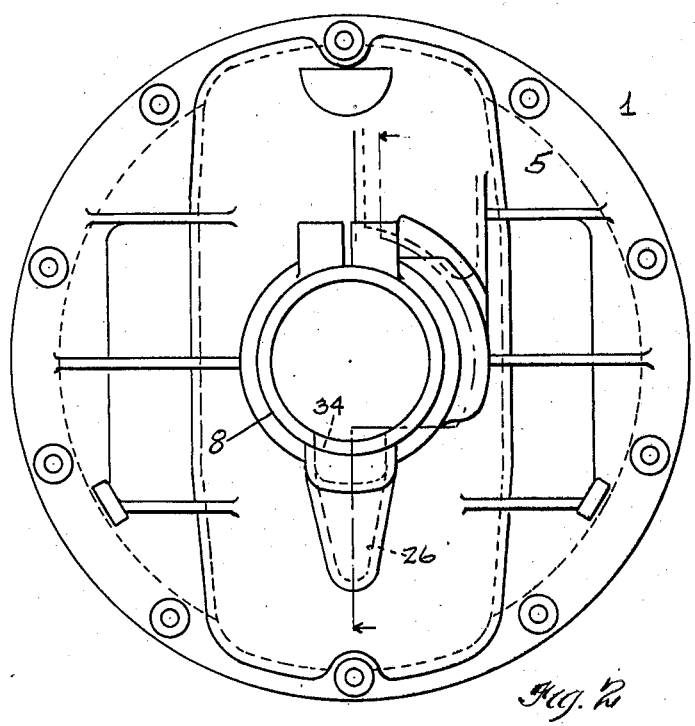
Figure 7:
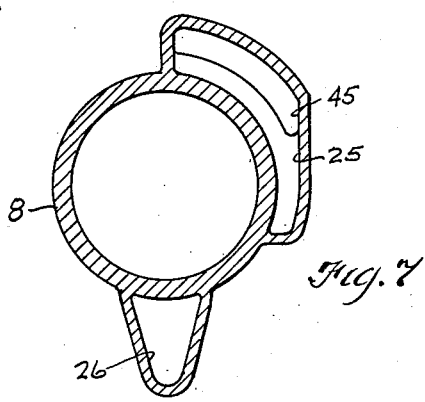

In said annexed drawings:—
Fig. 1 is a horizontal central section through the axle and driving shaft therefor; Fig. 2 is a front elevation of the front cover plate of such axle; Fig. 3 is a side elevation partially in section of said cover plate; Fig. 4 is a section on the line 4—4, Fig. 3; Fig. 5 is a section on the line 5—5, Fig. 3; Fig. 6 is a section on the line 6—6, Fig. 3; and Fig. 7 is a section on the line 7—7, Fig. 3.

In rear axles of the general type here illustrated and of the types usually employed in motor vehicles it has been found to be a matter of considerable difficulty to properly and efficiently lubricate the forward bearing which is at the greatest distance from the reservoir of lubricant supply in the base of the enlarged central portion of the axle housing, with the result that in some cases these forward bearings fail or become hot from lack of lubrication. Various attempts have been made to overcome this difficulty by leading the oil from the reservoir in the axle housing forwardly through passages to the bearings for the driving shaft and then returning this lubricant again to the housing, but such axles have been unsatisfactory because at times when any excess of lubricant is supplied to the forward bearing it is liable to pass through the packing and to leak out from the forward end of the housing for the driving shaft. The present invention is intended to supply an excess amount of lubricant to the driving shaft bearings and to effectually prevent any such leakage from the forward end of the housing at such times as any excess of lubricant is supplied to these points. I not only supply an excess amount of lubricant to the forward one of two bearings for the driving shaft, but I return this lubricant to the housing from a point which is beyond this forward bearing, and in this way insuring the passage of the excess amount of lubricant through the bearing to serve the purpose of washing out any particles of dirt or metal which would otherwise collect in these bearings, and of at all times securing an adequate supply of lubricant at this point.

In Fig. 1 there is shown an axle housing 1, provided with oppositely extending axle tubes 2, and with an enlarged central portion 3, which is provided with a removable rear cover plate 4 and a removable front cover plate 5. This construction is well known and need not be described in greater detail.

The front cover plate 5, which carries the double function of a cover and a gear and differential carrier, is constructed to carry the driving shaft 7 and the driving mechanism which operates the axle shafts 6, the inner ends of which are slipped through the hubs of differential cases 40 carried on bearings 30, which are carried in portions 31 of the front cover plate 5. The differential mechanism consists of a driving gear 10 driving the pinions 13 which are in mesh with gears 11 and 12 secured to the axle shafts 6, and the operation of such a mechanism is of course well understood. The driving gear 10 is operated from a driving pinion 9 integral with, or secured to, the inner end of the driving shaft 7, and the driving shaft 7 is carried in a forward bearing 15 mounted adjacent to the front end of a tubular extension 8, which is formed as an integral part of the cover plate 5, and in a rear bearing 16 mounted adjacent to the inner end of the driving shaft. These bearings 15 and 16 are spaced by means of a spacing ring or sleeve 32, which is spaced from the shaft 7, and is provided with a series of openings 25 which admit lubricant to the interior of this ring, from which point the lubricant may flow in either direction to lubricate the two bearings 15 and 16, as will presently be described.

The driving gear 10 dips into the lubricant, of which a considerable quantity is carried in the bottom of the enlarged central portion of the housing. This lubricant, being somewhat thick and viscous, clings to the periphery and sides of the gear, and owing to the comparatively low rate of speed of rotation, rarely exceeding 500 R. P. M., at 50 M. P. H., is not quickly thrown off by the centrifugal force and a great part of that which is thrown off strikes the walls of the back cover 4 and housing 1 and falls back on the gear, so that the lubricant is carried around on the gear in considerable quantities. I take advantage of this action of the lubricant and dispose a pocket 45 radially in line with gear 10, to receive a quantity of the lubricant discharged and wiped from the gear 10 by the lower lip 47 of the pocket 45. The lip 47 extends to within a short distance of the periphery of gear 10, closer than any other part of the mechanism, and since the centrifugal force tends to cause the lubricant to flow outwardly along the sides of the periphery, there is always plenty of lubricant which can be wiped off, even though the lubricant has to be carried around through nearly three-fourths of a revolution of gear 10 before reaching lip 47. The upper wall of pocket 45 is formed by recessing the wall 46 of cover plate 5, and the bottom of the pocket opens into chamber 23 so that the lubricant caught in pocket 45 is led into chamber 23, formed along one side of the cover plate extension 8. This chamber 23 communicates through passage 24 with openings 25 in spacing member 32, and the lubricant is thus led through openings 24 and 25 into the interior of the spacing member 32 around driving shaft 7. The lubricant then flows in either direction along through the annular space around the same, lubricating the two bearings 15 and 16 and escaping through these bearings. The lubricant which passes through and around the bearings 16 drains back directly into the bottom or well of the enlarged central portion of the axle housing, while the lubricant which passes through the bearing 15 flows through an opening 34 in the bottom wall of the extension 8 and into a conduit 26, which is formed along the bottom of this extension, and from this conduit back into the enlarged central portion of the housing.

I regard it as essential that the return passage 26 be of at least the same capacity as the effective passage through the bearing 15 in order that there be an opportunity for all of the lubricant which flows through this bearing to be returned to the housing. In this way there is no tendency for the lubricant to seek other outlets, as would be the case if the lubricant passing through this bearing had no return through the housing from a point beyond the bearing, or if the capacity of this return channel were insufficient to carry all the lubricant, which would then work its way out through the forward end of the extension on the housing in spite of any packing which might be placed at this point.

I have found that it is possible to prevent substantially any lubricant from reaching the packing gland at the forward end of the extension of the housing by providing a lubricant-throwing plate 48 which is formed to deflect and throw lubricant which may flow through the bearing 15 on to the walls of the extension 8, from which point it flows down and drains back through the return opening 34. This plate 48 is given a very slight clearance circumferentially from the wall of the extension 8 and is shaped and disposed so that its outer edge is approximately in line with the forward edge of the opening 34. This plate revolves with the shaft 7 at a fairly high speed and I have found it very effective in preventing any appreciable amount of lubricant from reaching the packing gland at the extreme forward end of the extension 8.

The forward end of extension 8 is sealed against the loss of lubricant and the entrance of foreign matter by means of a packing gland 35, consisting of packing material 36 which is held between sheet metal plates 37 and 38. Plate 38 is in oil-tight contact with the inner surface of extension 8. The packing material 36 is in contact with a spiral groove 39 formed on a sleeve 49 mounted on driving shaft 7, which groove is of the proper direction of rotation to return towards bearing 15, and hence to the housing, any lubricant which works past disk 48 while the axle is driving in a forward direction.

Ordinarily no lubricant will reach packing gland 35, but if any should work around plate 48 and down the inside wall of 38, the spiral groove 39, in conjunction with packing gland 35, will prevent any egress. A saucer-shaped metal plate 41, mounted at the end of extension 8, tends to prevent any leakage inward of water or mud that may splash against the end of the extension.

The present axle acts automatically, by the operation of the differential mechanism, to pass lubricant copiously through the forward extension in which the driving shaft is mounted and thus positively supply lubricant to the bearings for this driving shaft, and has been found in practice to completely remedy the former fault of lack of lubrication for the driving shaft bearings, while entirely preventing any leakage at the end of the extension 8 of the cover plate. Most axles allow the passage of some lubricant at this point, but the present construction has been found to entirely prevent any leakage either of lubricant out of the housing, or of water or mud into the housing around the shaft at this point, and this result is due to my return passage to the housing from a point forward of this bearing, to the capacity of this passage and to the lubricant-retaining means at the forward end of the extension on the housing.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an axle of the character described, the combination of an enlarged housing, a cover plate therefor provided with a tubular extension, bearings mounted in spaced relation in said extension, a shaft mounted in said bearings, means for conveying lubricant from said housing to said extension between said bearings, said bearings being adapted to permit lubricant to flow therethrough longitudinally of said extension, and said extension having a separate passage extending from said housing to a point beyond the most distant of said two bearings to return lubricant passing therethrough.

2. In an axle of the character described, the combination of an enlarged housing, a cover plate therefor provided with a tubular extension, bearings mounted in spaced relation in said extension, a shaft mounted in said bearings, means for conveying lubricant from said housing to said extension between said bearings, said bearings being adapted to permit lubricant to flow therethrough longitudinally of said extension, said extension having a separate passage extending from said housing to a point beyond the most distant of said two bearings to return lubricant passing therethrough, and said passage having a flow capacity at least equal to that of the adjacent bearing.

3. In an axle of the character described, the combination of an enlarged housing, a cover plate therefor provided with a tubular extension, spaced anti-friction bearings mounted in said extension, means for conveying lubricant freely from said housing to said extension, and means for returning to said housing lubricant passing through each of said bearings, the combined capacity of the flow of lubricant through said bearings being less than the flow capacity of said means for conveying lubricant to said extension, whereby an excess of lubricant will be maintained between said bearings and a pressure created to flush the lubricant therethrough.

Signed by me, this 21st day of July, 1924.

GEORGE W. HARPER.